UNITED STATES PATENT OFFICE.

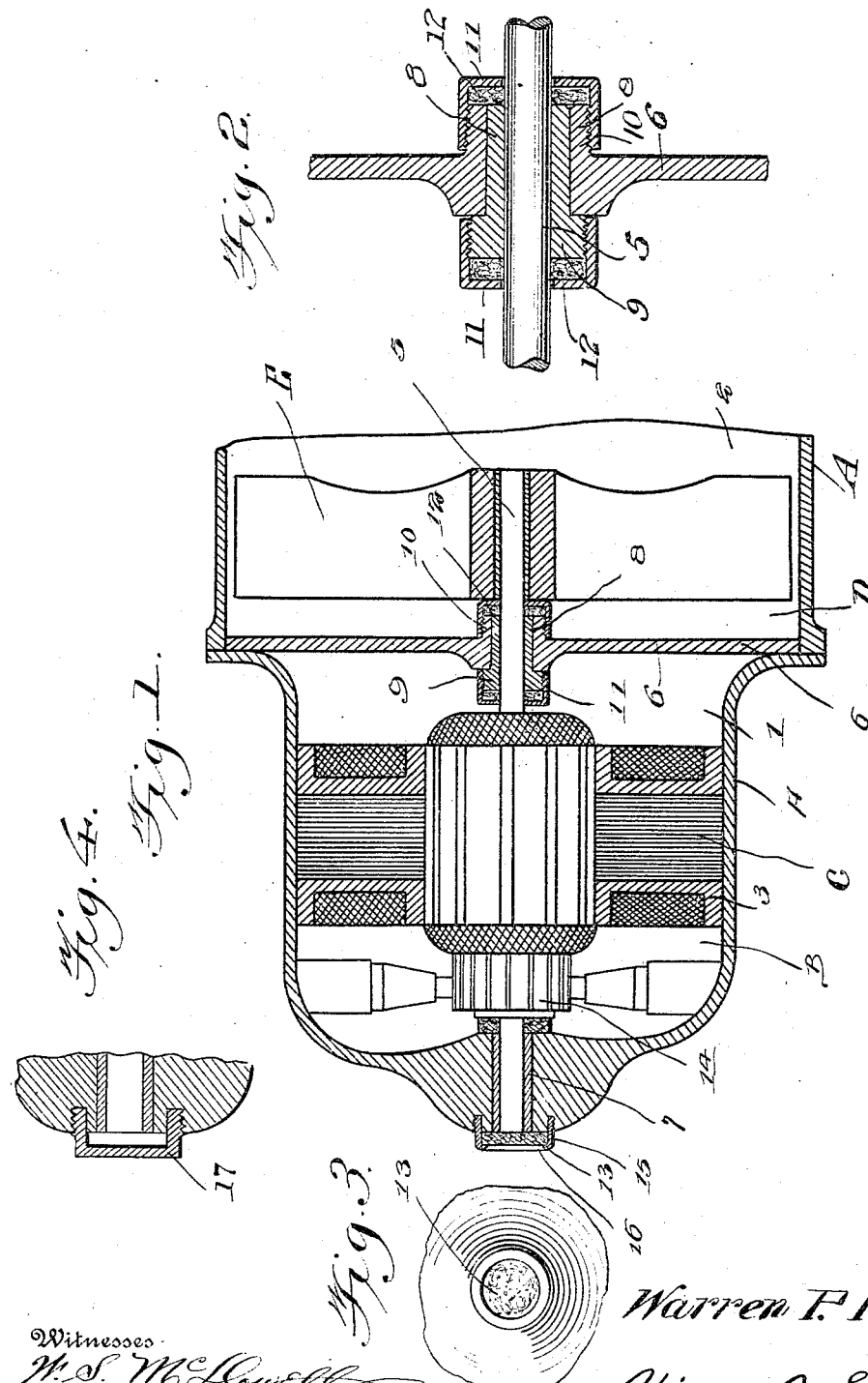

WARREN P. HAYNIE, OF PHILADELPHIA, PENNSYLVANIA, ASSIGNOR TO CHARLES W. EMORY, OF PHILADELPHIA, PENNSYLVANIA.

DUST-PROOF BEARING.

1,235,470.     Specification of Letters Patent.     Patented July 31, 1917.

Application filed January 23, 1915. Serial No. 4,027.

*To all whom it may concern:*

Be it known that I, WARREN P. HAYNIE, a citizen of the United States, residing at Philadelphia, in the county of Philadelphia and State of Pennsylvania, have invented new and useful Improvements in Dust-Proof Bearings, of which the following is a specification.

The invention relates to bearings, and more particularly to the class of dust-proof bearings for vacuum cleaners.

The primary object of the invention is the provision of a bearing of this character wherein the construction thereof renders it free from dust and foreign matter so that the life of the bearing is increased and wear resultant therefrom obviated.

Another object of the invention is the provision of a bearing of this character which is simple in construction, reliable and efficient in its purpose, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing:—

Figure 1 is a fragmentary vertical longitudinal sectional view through a motor of a suction cleaner showing the bearings constructed in accordance with the invention therein.

Fig. 2 is an enlarged sectional view showing in detail one of the bearings.

Fig. 3 is a plan view of the cap for the other bearing.

Fig. 4 is a fragmentary sectional view showing a flanged cap for the bearing without the use of a washer.

Similar reference characters indicate corresponding parts throughout the several views in the drawing.

Referring to the drawing in detail, A designates generally a motor casing, B the compartment therein for the electric motor C, while D is a compartment for the fan E to be driven by the motor, and is supported upon the usual armature shaft 5, the compartment B being separated from the compartment D through the medium of a partition 6 which is arranged and held fast in the casing A in any suitable manner.

The bearings for the armature shaft 5 comprise sleeves or bushings 7 and 8, respectively, the same being fitted in openings in the motor casing A and the partition 6, which openings are in alinement with each other, the sleeves or bushings 7 being passed through the openings and surround the armature shaft 5. These sleeves or bushings 7 and 8 are made fast in any suitable manner.

The sleeve or bushing 8 is formed with an annular flange 9 at one end, while formed on the partition 6 at one side thereof is a boss 10 which is concentrically disposed about the sleeve or bushing 8, and with this flange and boss are detachably connected caps 11 which may be frictionally held thereon or threaded upon the same, and have arranged therein washers 12, which are preferably made from felt or other similar material, the said washers being held against the ends of the sleeve or bushing 8 through the medium of the said caps 11. By this construction it will be seen that dust entering the compartment B will be positively prevented from entering the bearing in the partition 6 and also will be excluded from the compartment containing the motor through the said bearing, thereby obviating the accumulation of dust and foreign matter in the bearing, which would result in damage thereto.

The bushing 7 surrounding the armature shaft 5 has disposed against its inner and outer ends washers 13, preferably made from felt or other like material, the innermost washer being held against the inner face of the motor casing B through the medium of the commutator 14 of the motor, while the outermost washer 13 is held in place by means of the detachable cap 15 which is threaded or pressed into the casing A and is formed with an inturned flange 16 which engages with the said washer. The washers will prevent any dust from entering the bearing 7 or the motor casing.

In Fig. 4 there is shown a slight modification of the invention wherein a flanged cap 17 is employed to close one end of the bearing.

From the foregoing description, taken in connection with the accompanying drawing, it is thought that the construction and manner of use of the device will be clearly understood and therefore a more extended explanation has been omitted.

What is claimed is:—

1. In a device of the class described, a support having a boss upon one side thereof and an opening passing through said boss, a sleeve received in said opening and having a flange adjacent an end thereof for contact with the other side of said support, packings at the ends of said sleeve, and caps movably connected with said flange and boss, in combination with a shaft passing through said caps, the packings and sleeve.

2. In a device of the class described a support having a threaded boss upon one side thereof and an opening passing through said boss, a sleeve fixed in said opening and having a threaded flange adjacent an end thereof bearing against the other side of said support, packings for engagement with the ends of said sleeve, caps threadedly connected with said flange and boss and engaging said packings, in combination with a shaft passing through said caps, the packings and sleeve.

In testimony whereof I affix my signature in presence of two witnesses.

WARREN P. HAYNIE.

Witnesses:
SELINA B. DEACON,
NORMAN J. SMITH.

Copies of this patent may be obtained for five cents each, by addressing the "Commissioner of Patents, Washington, D. C."